Patented Sept. 28, 1937

2,094,316

UNITED STATES PATENT OFFICE 2,094,316

METHOD OF IMPROVING OIL WELL DRILLING MUDS

Roy Cross and Matthew Forbes Cross, Kansas City, Mo., assignors to Kansas City Testing Laboratory, Kansas City, Mo., a corporation of Missouri No Drawing. Application March 6, 1936, Serial No. 67,530

7 Claims. (Cl. 255—1)

This invention relates to the process of improving oil well drilling muds. It more specifically has to do with the use of mixtures of base exchange zeolites and water to produce oil well drilling mud or to be added to ordinary drilling mud. The usual oil well mud is made from clay or shale like matter obtained locally at the well site. The muds are used in the rotary drilling system in which a cutting tool is fastened to the end of the drill pipe. This drill pipe is hollow and together with the bit or cutting tool, is turned by means of a rotating table at the top of the well. The cuttings instead of being baled out as in the case of drilling with cable tools, are continuously removed. This removal is effected by pumping the drilling fluid down through the drill pipe which is ordinarily about six inches in diameter, out over the bit in the bottom of the well and back on the outside of the drill pipe between the drill pipe and the casing or the wall of the well. The muds for this purpose must be sufficiently fluid to be readily pumped and have a sufficient viscosity to wash away the cuttings from the face of the bit and carry them by reason of this viscosity to the top of the well where they are removed by screens and by sedimentation and the mud is returned to the well. In this circulation, it is necessary that the formations above the bit be sealed off sufficiently to prevent loss of the water from the drilling mud. In order to effect this sealing off, it is necessary that the mud block the flow of fluid out into the formation and the flow of fluid from the formation. The latter is accomplished by reason of the pressure of the column of liquid in the hole. The first is accomplished by selecting a mud which will properly close the interstices in the particles of the material composing the wall. If the water penetrates the wall of the hole, it will usually cause caving or if the water penetrates to such an extent that it does not come back to the surface of the hole, the head of the liquid is lowered and gas, oil or artesian water under pressure will tend to be released into the hole and the wall will cave and the well will blow out.

When drilling an oil well, it is desirable to drill as much hole as is possible without setting casing to support the wall of the hole. The oil well mud therefore, performs a function of plastering up the side of the wall so that it remains intact while the bit is being sent deeper.

Ordinary muds used in oil well drilling contain from 25% to 40% of total solids and are prone to separate into two layers. They have a tendency to give up the water to the wall of the hole without proper sealing. In such case, a large amount of solids build up which fall back in the hole. It is desirable to seal with the thinnest possible film of colloidal matter or to seal by causing the mud to gel as it passes into the interstices of the wall.

The present invention has to do with the use of selected zeolites or zeolitic clays which have the property of exchanging their bases. The bases may be magnesium, calcium or an alkali such as sodium. By the law of mass action, the sodium will replace the magnesium or calcium to a certain degree when the sodium is present in very high concentrations, for example, in the form of a 10% salt brine. On the other hand, a small concentration of calcium or magnesium will replace the sodium to form calcium zeolite or magnesium zeolite. As a general thing, the calcium zeolite has less tendency to form a colloidal mixture than the magnesium or sodium zeolite. A calcium zeolite suspension may therefore, be allowed to penetrate a sandstone and when it comes into contact with salt such as occurs in brine, thickens by reason of the formation of sodium or magnesium zeolite.

Certain clays, particularly such as those found in northern Florida, contain a large amount of base exchange zeolite. A lump of this clay when added to water will not form a gel and will not swell as in the case of bentonite. Such a clay will not react with magnesium oxide as does bentonite. However, when passed through a colloid mill either with or without undergoing base exchange activity, it will produce a viscous mixture with from 1% to 10% concentration in water. For example, a 4% mixture when run through a colloid mill will produce a suspension which has a viscosity of from 20 to 100 centipoises as determined by the Stormer viscosimeter. A special clay, for example, such as that obtained from Quincy, Florida, is representative. Four parts of this clay when mixed with 96 parts of water gives a viscosity of 48 when passed through a colloid dispersion mill. The same mixture when shaken in a shaking machine or an ordinary bottle gives a viscosity of 3; when mixed with a blade stirrer such as a malted milk machine, gives a viscosity of 19.

A typical analysis of this zeolitic clay after air drying is as follows:

| | Percent |
|---|---|
| Moisture | 2.65 |
| Loss on ignition | 9.73 |
| Silica | 62.02 |
| Alumina | 10.62 |
| Iron oxide | 3.60 |
| Lime | 1.50 |
| Magnesia | 8.99 |
| Sulphur | 0.05 |
| Alkalies | 0.84 |
| | 100.00 |

Other zeolites have a larger percentage of lime or alkalies. This particular zeolitic clay predominates in magnesia. Magnesia, alkali and lime may to a varying degree replace each other. In some zeolitic clays such as a typical one from near Ocala, Florida, the lime predominates. In this case, to obtain the highest viscosity, the clay should be treated with alkalies, particularly alkalies producing hydroxyl ions such as sodium hydroxide or sodium carbonate. When the clay contains a large amount of magnesium zeolite, such conversion is not necessary or desirable as the magnesium seems to confer considerable viscosity and permits dispersion in a colloid mill or other suitable mill to the ultimate particles.

Ordinary clays when dispersed in a colloid mill do not give the viscosity that is developed with base exchange zeolitic clays. For example, an ordinary kaolin will require 30% or more of solids per 100 grams of mixture to give a viscosity approximating that of 4% Quincy, Florida, base exchange zeolite with 96% water.

The usual viscosity desired for oil well drilling mud is from 5 to 50 centipoises. This viscosity may be attained by a total solid content of base exchange zeolite of from 1% to 5%.

It is to be understood, however, that this invention is not limited to base exchange zeolites of the above composition. Some of these base exchange zeolites have a very much larger amount of alumina and a lower amount of silica. For example, natrolite which has been reversed by alternate treatment with alkali and magnesium has approximately the following composition:

| | Percent |
|---|---|
| Silica | 53.0 |
| Alumina and iron oxides | 29.0 |
| Alkali | 18.0 |
| | 100.0 |

Artificial magnesium zeolite may have the following composition:

| | Percent |
|---|---|
| Silica | 57.0 |
| Alumina | 26.0 |
| Alkali and magnesium | 17.0 |
| | 100.0 |

Some fuller's earth such as at Jamieson, Florida, contain a large percentage of base exchange zeolites. As is apparent from the foregoing, the base exchange zeolite may be used in the proportion of from 1% to 10% with water alone to make a virgin oil well mud of viscosity of from 5 to 50 centipoises, dependent upon the quality of the zeolite and type of base and the particular result desired. Or the zeolite may be added in small quantities to the oil well mud already made to increase the viscosity or improve its sealing and wall building properties. In all cases, it should be incorporated by passing the mixture through a colloid mill or a dispersion mill of the type shown in the co-pending application of Matthew Forbes Cross Serial No. 68,282, filed March 11, 1936, which has now matured into U. S. Patent No. 2,044,757.

I claim:

1. A mud laden fluid for oil or gas wells containing a colloidally dispersed natural zeolitic clay.

2. A mud laden fluid for oil or gas wells containing a colloidally dispersed natural zeolitic clay and an alkali.

3. The process of improving oil well drilling mud which includes adding to the mud a colloidally dispersed base exchange natural zeolitic clay.

4. A mud laden fluid for drilling oil and gas wells containing a zeolitic clay of such natural particle fineness that when colloidally dispersed in water in quantities thereof less than about 10% will produce a dispersion having a viscosity greater than about 5 centipoises.

5. A mud laden fluid for drilling oil and gas wells containing a natural base exchange zeolitic clay of the Florida-Georgia type, which, when colloidally dispersed in water in quantities of from 1% to 10% will produce a dispersion having a viscosity greater than about 5 centipoises.

6. The process of improving oil well drilling mud which includes adding to the mud a base exchange zeolitic clay of such natural particle fineness that quantities thereof less than about 10% when colloidally dispersed in water will produce a dispersion having a viscosity greater than about 5 centipoises.

7. The process of improving oil well drilling mud which comprises adding to the mud a natural base exchange zeolitic clay of the Florida-Georgia type, which, when colloidally dispersed in water in quantities from about 1% to about 5% of the dispersion, will produce a dispersion having a viscosity greater than about 5 centipoises.

ROY CROSS.
MATTHEW FORBES CROSS.